(12) United States Patent
    Rauhala

(10) Patent No.:  US 12,573,549 B2
(45) Date of Patent:  Mar. 10, 2026

(54) MAGNETIC FIELD AUDIO LOOP FOR SWIMMING POOLS

(71) Applicant: Finnovate Group, LLC, Solana Beach, CA (US)

(72) Inventor: Kari Kristian Rauhala, Solana Beach, CA (US)

(73) Assignee: Finnovate Group, LLC, Solana Beach, CA (US)

( * ) Notice: Subject to any disclaimer, the term of this patent is extended or adjusted under 35 U.S.C. 154(b) by 0 days.

(21) Appl. No.: 18/737,784

(22) Filed: Jun. 7, 2024

(65) Prior Publication Data

US 2024/0347268 A1    Oct. 17, 2024

Related U.S. Application Data

(63) Continuation of application No. 18/114,518, filed on Feb. 27, 2023, now Pat. No. 12,009,147, which is a continuation of application No. 17/530,115, filed on Nov. 18, 2021, now Pat. No. 11,594,369.

(51) Int. Cl.
    *H01F 38/14*        (2006.01)
    *H02J 50/10*        (2016.01)
    *H02J 50/80*        (2016.01)
    *H04R 1/44*         (2006.01)

(52) U.S. Cl.
    CPC .............. *H01F 38/14* (2013.01); *H02J 50/10* (2016.02); *H02J 50/80* (2016.02); *H01F 2038/143* (2013.01); *H04R 1/44* (2013.01); *H04R 2420/07* (2013.01)

(58) Field of Classification Search
    CPC .... H01F 38/14; H01F 2038/143; H02J 50/80; H02J 50/10; H04R 1/44; H04R 2420/07
    USPC .......................................................... 307/104
    See application file for complete search history.

(56) References Cited

U.S. PATENT DOCUMENTS

| | | | |
|---|---|---|---|
| 10,645,476 B2 * | 5/2020 | Miskin .................... | H04R 1/025 |
| 11,051,100 B1 * | 6/2021 | D'Ascanio ............... | H04R 1/44 |
| 2007/0149261 A1 | 6/2007 | Huddart | |
| 2009/0279389 A1 | 11/2009 | Irie | |
| 2012/0222997 A1 * | 9/2012 | Potucek .................. | H01F 38/14 |
| | | | 307/104 |
| 2014/0348367 A1 * | 11/2014 | Vavrus ..................... | H04R 1/44 |
| | | | 381/334 |
| 2017/0183068 A1 * | 6/2017 | Lindman ............... | G01S 5/0226 |
| 2017/0288731 A1 | 10/2017 | Kerselaers | |
| 2018/0234190 A1 * | 8/2018 | Rauhala .................. | H04B 5/00 |
| 2018/0294893 A1 * | 10/2018 | Pedersen .................. | H04N 5/77 |

(Continued)

*Primary Examiner* — Alfonso Perez Borroto
(74) *Attorney, Agent, or Firm* — FisherBroyles LLP; James P. Cleary

(57)            ABSTRACT

A system for providing magnetic field audio signals to a receiver in an aquatic environment. The system includes an audio source configured to provide an electronic audio signal, and an induction loop amplifier configured to receive the electronic audio signal and convert the received electronic audio signal into a current. The system further includes a wire loop connected with the induction loop amplifier, the wire loop bounding at least part of the aquatic environment and around the receiver in the aquatic environment, the wire loop producing a magnetic field from the current to generate an audio frequency induction loop to transmit the electronic audio signal to the receiver in the aquatic environment.

5 Claims, 3 Drawing Sheets

(56)                    References Cited

U.S. PATENT DOCUMENTS

| 2019/0089469 | A1* | 3/2019 | Goren | .................... | H04B 13/02 |
| 2019/0372403 | A1* | 12/2019 | Park | ........................ | H04B 5/79 |
| 2023/0208465 | A1* | 6/2023 | Blom | .................... | H04B 1/385 |
| | | | | | 367/134 |

* cited by examiner

200

MAGNETIC FIELD AUDIO LOOP FOR SWIMMING POOLS

CROSS-REFERENCE TO RELATED APPLICATIONS

The current application is a continuation of U.S. application Ser. No. 17/530,115 filed Nov. 18, 2021 and entitled "MAGNETIC FIELD AUDIO LOOP FOR SWIMMING POOLS," which is incorporated by reference herein.

BACKGROUND

An aquatic environment, such as a body of water like a swimming pool, pond, the ocean, or the like, is a very difficult environment in which to transmit or propagate wireless signals such as digital audio signals. The water in such bodies of water tends to absorb radio signals such as Bluetooth, WiFi, or other wireless radio transmissions, from an audio source such that those signals will not reach a receiver in the water. The receiver can be wireless ear buds or headphones worn by a swimmer, for example.

Accordingly, what is needed is a system for improving audio signal transmission from an audio source and reception by an audio receiver in an aquatic environment.

SUMMARY

This document describes a magnetic field audio loop for swimming pools, for providing wireless audio signals to a swimmer wearing an audio receiver configured to receive audio signals over a wireless channel.

In some aspects, a system for providing magnetic field audio signals to a receiver in an aquatic environment is disclosed. The system includes an audio source configured to provide an electronic audio signal, and an induction loop amplifier configured to receive the electronic audio signal and convert the received electronic audio signal into a current. The system further includes a wire loop connected with the induction loop amplifier, the wire loop bounding at least part of the aquatic environment and around the receiver in the aquatic environment, the wire loop producing a magnetic field from the current to generate an audio frequency induction loop to transmit the electronic audio signal to the receiver in the aquatic environment.

In some aspects, the aquatic environment is a swimming pool, and the wire loop includes a wire provided in one or more lane lines that are connected between opposite ends of the swimming pool. In certain aspects, the wire loop includes the wire provided in the one or more lane lines, and a connector wire connected with the one or more lane lines to form the wire loop.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a magnetic field audio loop, for providing wireless audio signals to a swimmer wearing an audio receiver in a swimming pool. The audio receiver is configured to receive audio signals over a wireless channel between an audio source and the audio receiver.

Figure 1:
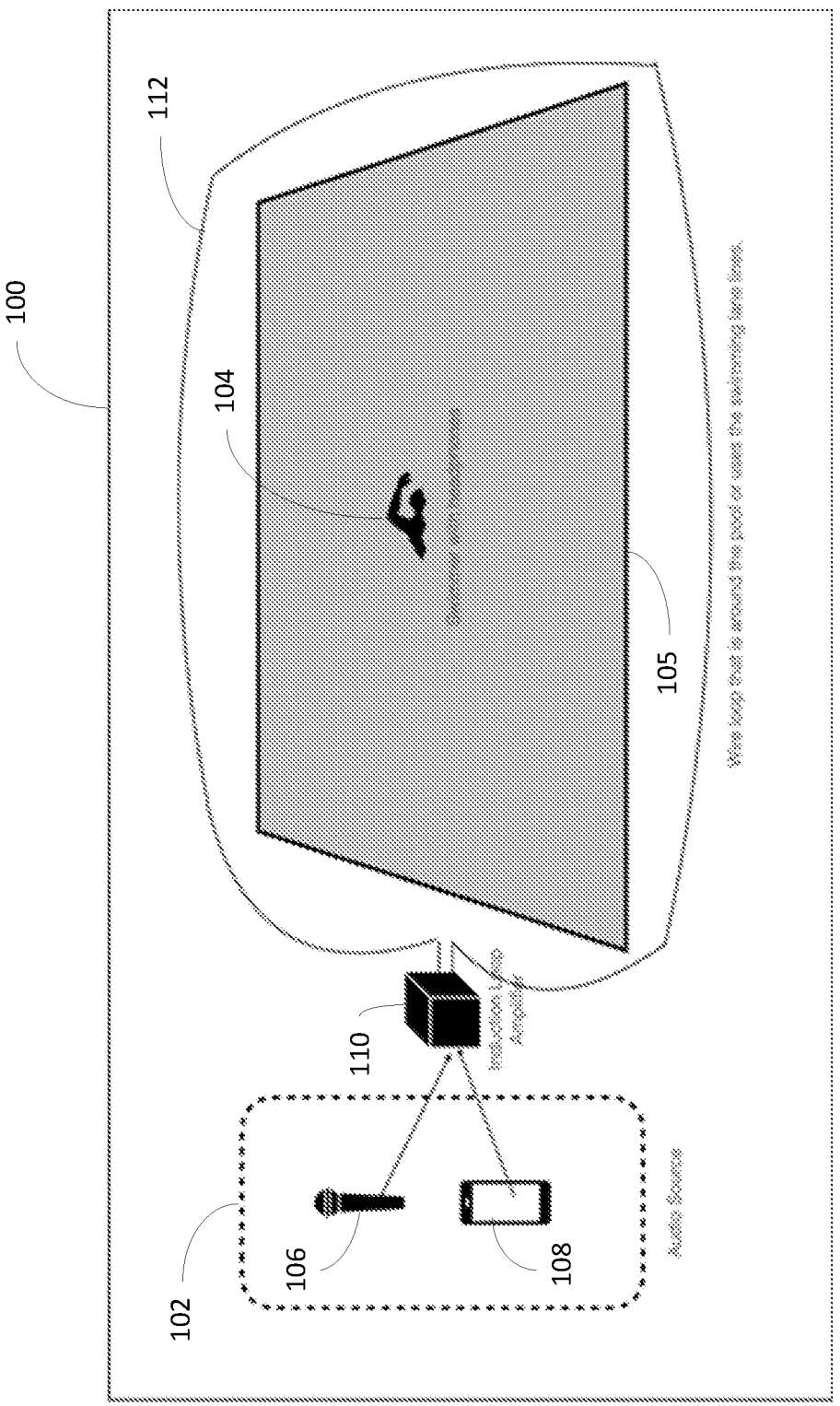
FIG. 1 illustrates a magnetic field audio loop system consistent with implementations of the subject matter described herein.

FIG. 1 illustrates a magnetic field audio loop system 100 for an aquatic environment, consistent with implementations of the subject matter described herein. The magnetic field audio loop system 100 includes an audio source 102 that is configured to provide audio signals over at least one wireless transmission channel to an audio receiver 104 worn by or connected with a swimmer in an aquatic environment 105 such as a swimming pool, pond, lake, the ocean, or the like. The audio receiver 104 can include an audio amplifier and headphones, such as waterproof ear buds for example.

The audio source 102 can include a microphone 106, an audio player 108 such as a smartphone, digital audio player, computer, or the like, or any other audio player device. An output of the audio source 102 is sent to an induction loop amplifier 110 or other amplification and transmission device, which in turn amplifies the output of the audio source 102, in the form of a digital audio signal, for transmission onto a wire loop 112 to create a magnetic field for transmission of the audio signal to the audio receiver 104 within the wire loop 112.

The wire loop 112 can circumscribe or bound the aquatic environment, or a portion thereof, and can be placed at or proximate to a water surface of the aquatic environment. For instance, the induction loop amplifier 110 can have multiple outputs to a corresponding number of wire loops 112, each configured to circumscribe or bound a separate region of the aquatic environment 105. When connected to the audio source 102 and induction loop amplifier 110, the wire loop 112 can transmit magnetic radiation that is modulated with audio signal, for receipt and playing by the audio receiver 104.

The induction loop amplifier 110 receives the audio signal (wired or wireless), converts the audio signal to a digital signal if necessary, and modulates it into a current for placement on or transmission through the wire loop 105. The current on the wire loop 105 creates a magnetic field that is then modulated with the audio, to produce an audio frequency induction loop.

The audio source 102 can be a coach or a spectator speaking on the microphone 106, the cellphone 108 playing music or other audio, etc. The audio source 102 can be connected to the induction loop amplifier 110 wirelessly (i.e. via Bluetooth) or via one or more wired connections.

The wire loop 112 is looped around some or all of the aquatic environment 105. For instance, the wire loop 112 can be looped around the aquatic environment 105 externally, i.e., external to the water within the aquatic environment 105, such as outside a perimeter of the aquatic environment 105 or suspended above the surface of the water in the aquatic environment 105. Alternatively, the wire loop 112 can be placed at least partially within the aquatic environment 105, such as anchored to sides of a swimming pool for example, or at least partially embedded in lane lines that separate designated lanes in a swimming pool that forms the aquatic environment 105.

As described above, and as illustrated in FIG. 2, implementations of the current subject matter can include the use of lane lines, which are made of metal wires with plastic lane markers to designate and separate swimming lanes of a swimming pool. Such use of lane lines can provide a lane specific audio loop for swimmers in a swimming pool or other defined aquatic environment.

Figure 2:
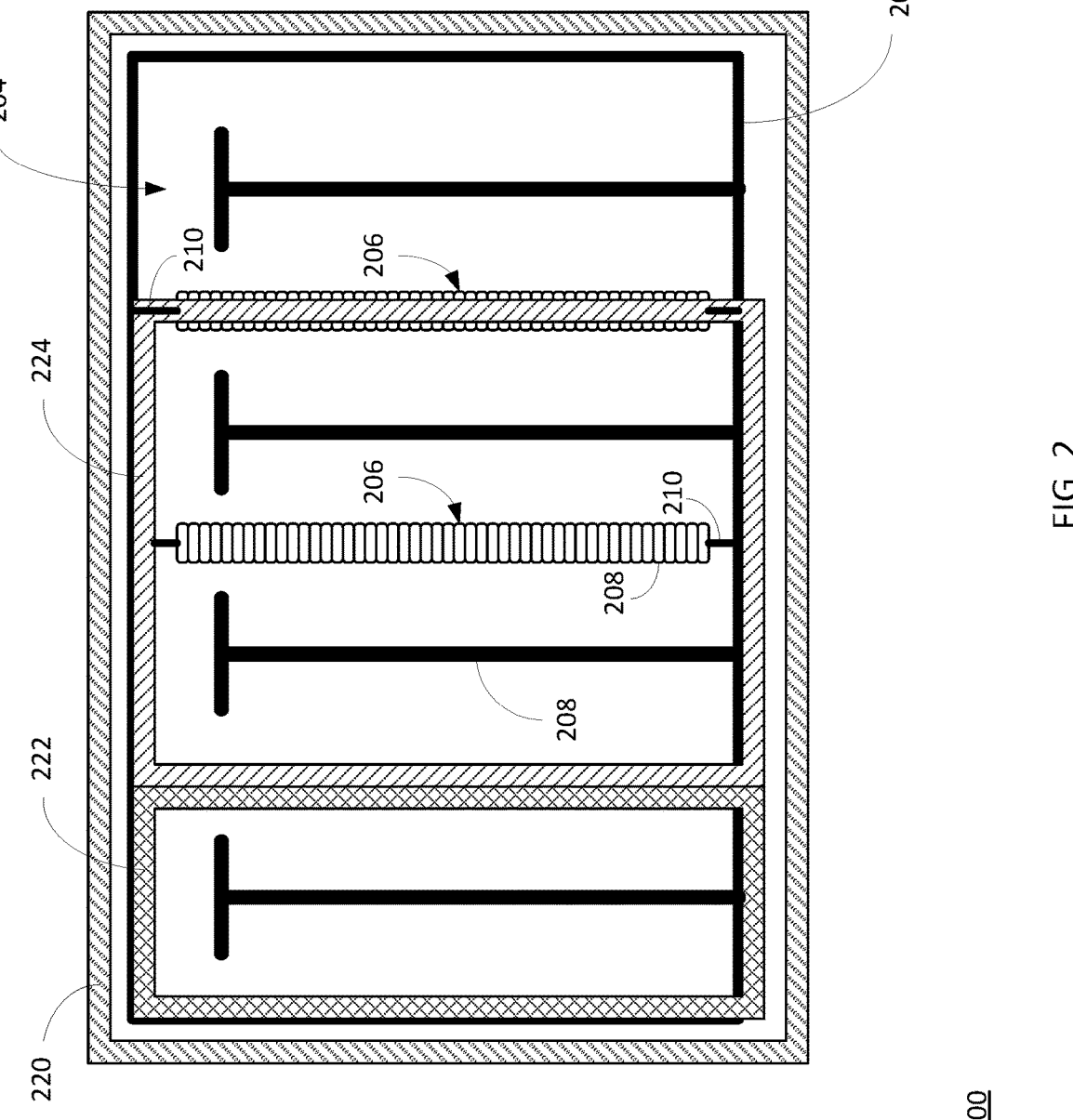
FIG. 2 illustrates an aquatic environment in the form of a swimming pool with a number of swim lanes spaced apart and divided by lane lines, which can form part of a magnetic field audio loop system.

FIG. 2 illustrates an aquatic environment 200 having a swimming pool 202 with a number of swim lanes 204, which can be spaced apart and divided by lane lines 206. The aquatic environment 200 can also be any of a lake, pond, ocean, or any other body of water. One or more of the lane lines 206 can form part of a magnetic field audio loop system that is described above. Each of the lane lines 206 is formed of a large number of independent wave-dampening plastic rings 208 and/or air-filled rings, which are threaded by a cable 210 that connects to opposite ends of the pool 202. The cable 210 is typically made of steel, and therefore conductive, wires, one or more of which can be used as a part of a wire loop for the magnetic field audio loop system.

In some implementations, the cable 210 of each lane line 206 can be formed of, or can include, a wire that can form part of a wire loop for magnetic field audio transmission within the loop. Each wire loop can form a separate audio transmission and reception zone, for transmission of audio signals within an area circumscribed by each wire loop.

The magnetic field audio loop system can be applied to any aquatic environment such as a pool, or to one or more parts of the aquatic environment. For instance, in the pool 202 implementation as shown in FIG. 2, a first audio transmission and reception zone 220 can be formed by a wire loop around the entire pool 202. Alternatively, or coincidentally, a second, and separate, audio transmission and reception zone 222 can be formed around an individual lane 204 of the pool 202, by having part of the wire loop integrated within a lane line 226 that separates an adjacently-located swimming pool lane 204. An audio transmission and reception zone 224 can also be formed to cover multiple lanes 204 of the pool 202, and created by a wire loop that is formed by two lane lines 206 with a connector wire connected therebetween at both ends of the pool 202.

While lane lines 206 can be used to carry part of the wire loop of the magnetic field audio loop system, lane lines 206 are not necessary, especially if the wire loop is configured to circumscribe the entire pool 202. However, the use of lane lines 206 to carry portions of the wire loop allow for segmenting a pool 202 or other aquatic environment into multiple, independent audio transmission and reception zones, and where the wire loop for each zone can be coupled to its own induction loop amplifier and audio source.

Figure 3:
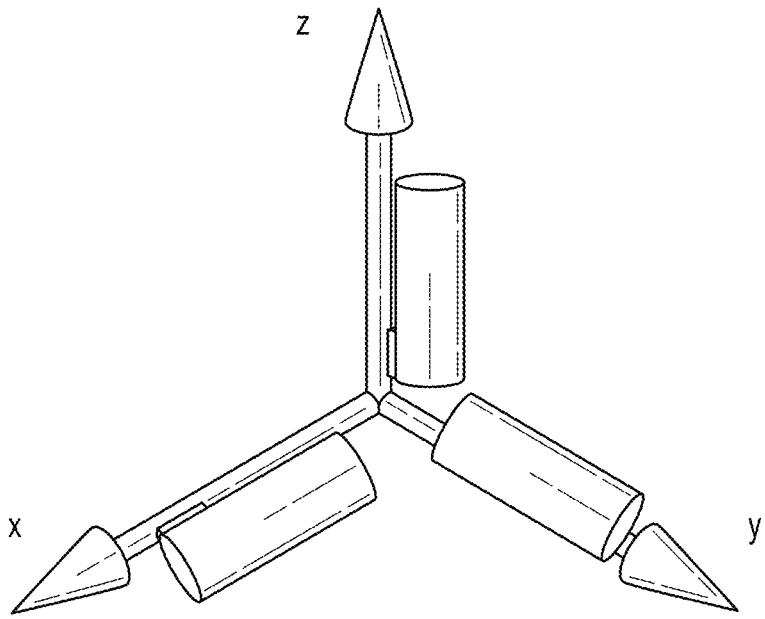
FIG. 3 shows a three-dimensional coil antenna that can be internal to a receiver and/or headphones for receipt of audio signals transmitted via a magnetic field wire loop transmitter.

Each audio transmission and reception zone forms a source audio loop (SAL). Swimmers or other occupants within each SAL can use a waterproof headset with a coil antenna, as shown in FIG. 3, that is magnetically coupled to the SAL and picks up the magnetic signals. The swimmer headset then converts or demodulates the signal to audio and plays it through the headphones.

FIG. 3 shows a three-dimensional coil antenna that can be internal to a receiver and/or headphones for receipt of audio signals transmitted via a magnetic field wire loop transmitter. The three-dimensional antenna design allows the headphones to select or combine the reception from the antenna that is best coupled with the SAL. Magnetic inductance or coupling happens best when the antennas are on the same plane (parallel) as the wire loop of the induction transmission system. As the swimmer is moving and rotating his or her head, at least one antenna is always parallel to the SAL (water surface) resulting in an uninterrupted coupling and reception of audio by the swimmer.

Although a few embodiments have been described in detail above, other modifications are possible. Other embodiments may be within the scope of the following claims.

The invention claimed is:

1. A system for providing audio signals to an aquatic environment from an audio source configured to provide the audio signals, the system comprising:
   an induction loop amplifier configured to receive the audio signals from the audio source and convert the received audio signals into a current; and
   a wire loop connected with the induction loop amplifier, the wire loop being configured to circumscribe at least part of the aquatic environment and around a receiver in the aquatic environment within the wire loop, the wire loop producing a magnetic field from the current to generate an audio frequency induction loop to transmit the electronic audio signal to the receiver in the aquatic environment.

2. The system in accordance with claim 1, wherein the induction loop amplifier is connected to opposite ends of the wire loop.

3. The system in accordance with claim 1, wherein the system includes a plurality of wire loops, and wherein the induction loop amplifier includes a plurality of outputs, each output being connected to one of the plurality of wire loops.

4. The system in accordance with claim 1, wherein the receiver includes waterproof headphones.

5. The system in accordance with claim 4, wherein the receiver is configured to be worn by a person in the at least part of the aquatic environment within the wire loop.

* * * * *